Nov. 12, 1940.    J. J. McLAUGHLIN    2,221,598
MACHINE AND METHOD FOR MAKING NUT BLANKS
Filed Dec. 21, 1938    8 Sheets-Sheet 5
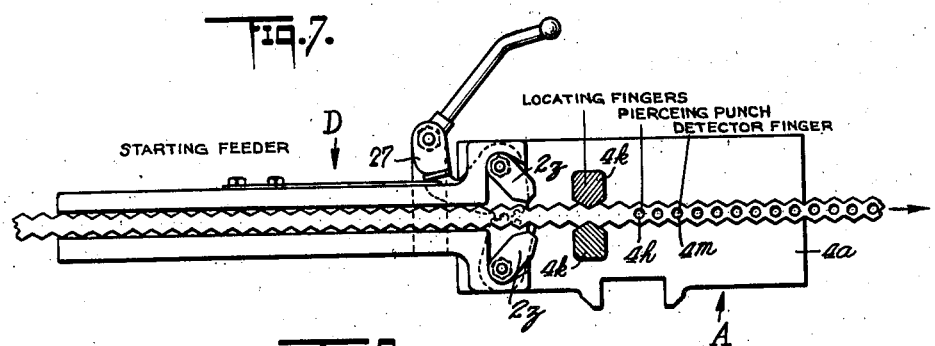
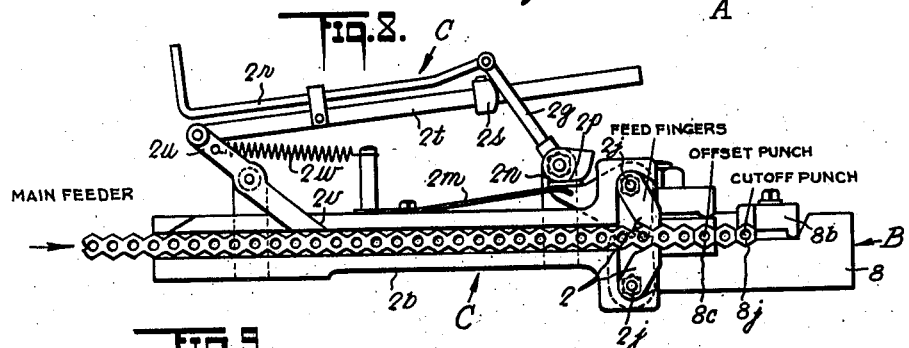
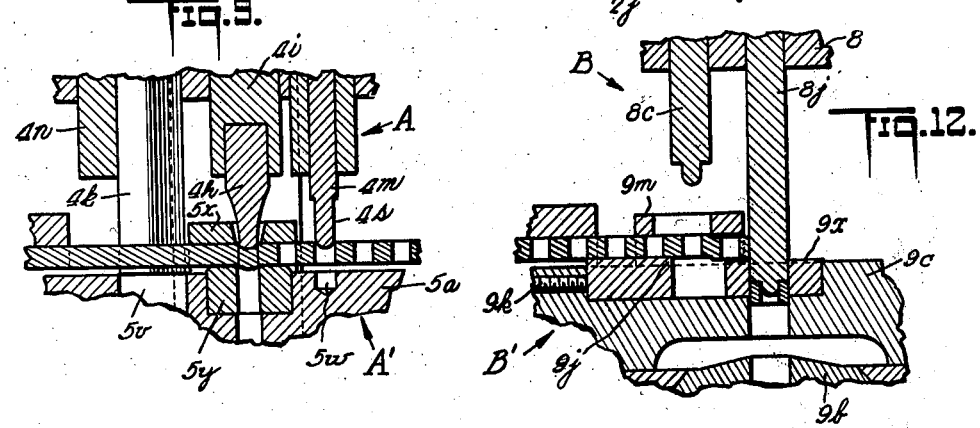
INVENTOR
John J. McLaughlin
BY
ATTORNEY Nov. 12, 1940. J. J. McLAUGHLIN 2,221,598
MACHINE AND METHOD FOR MAKING NUT BLANKS
Filed Dec. 21, 1938 8 Sheets-Sheet 7
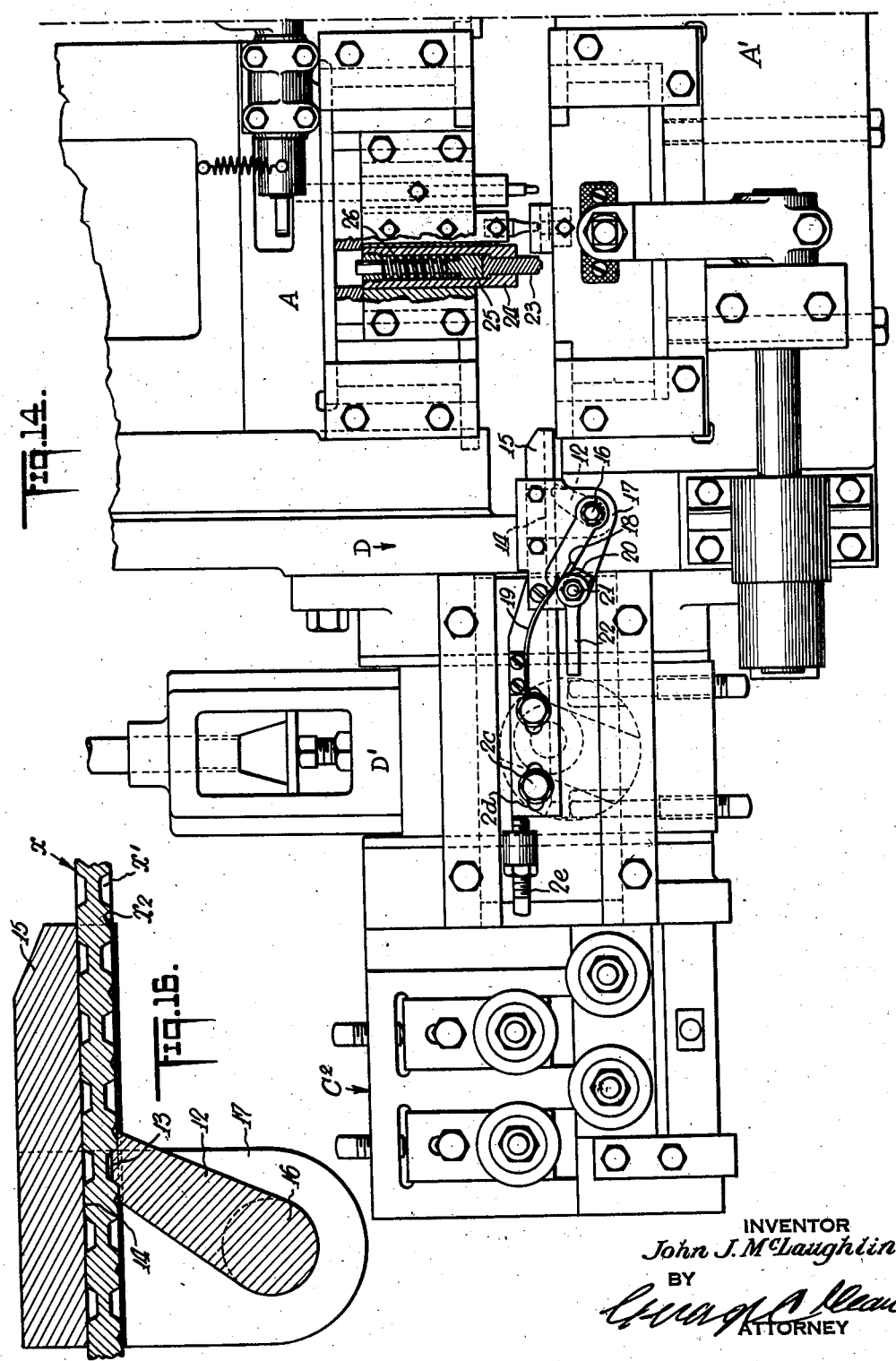
INVENTOR
John J. McLaughlin
BY
ATTORNEY

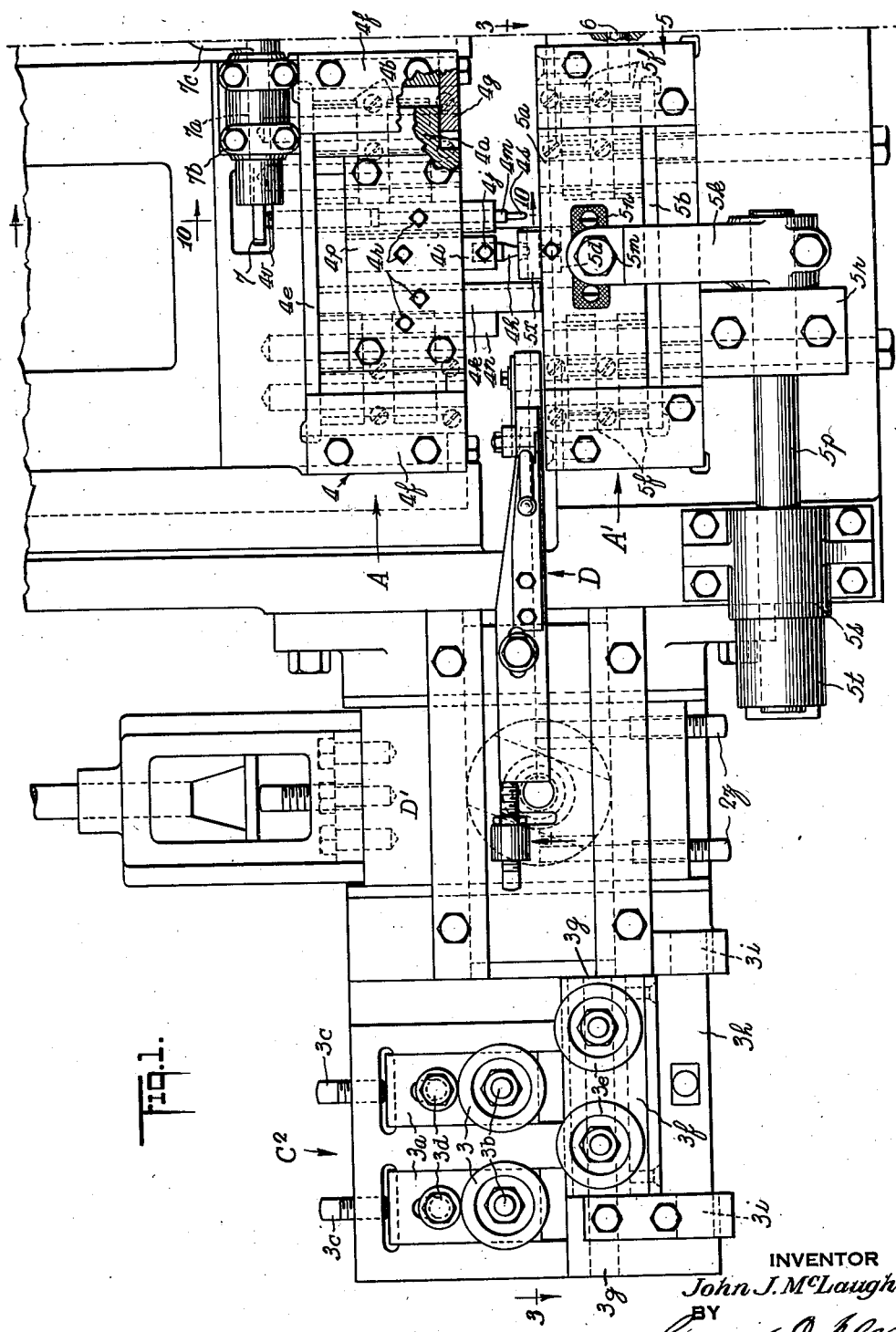

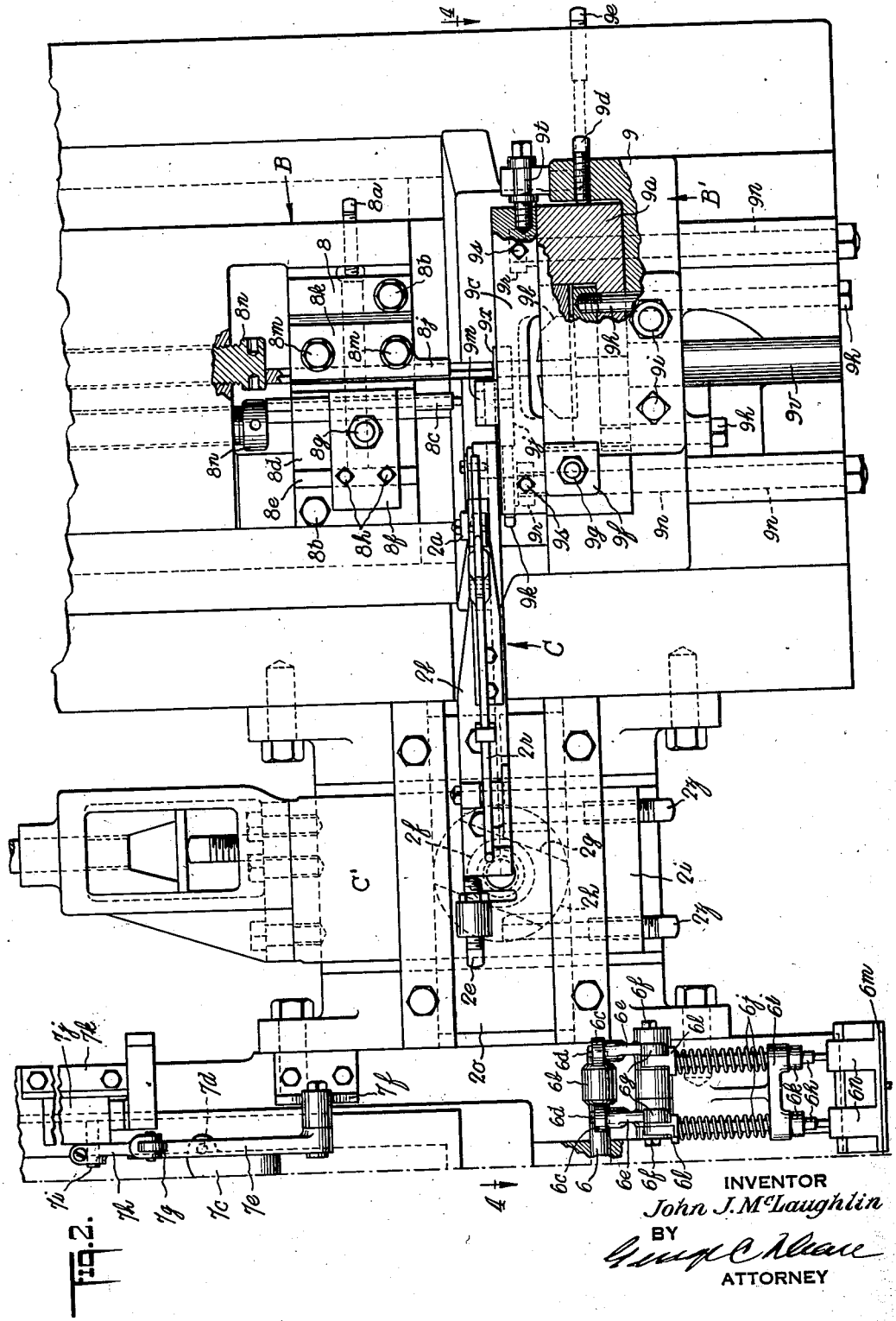

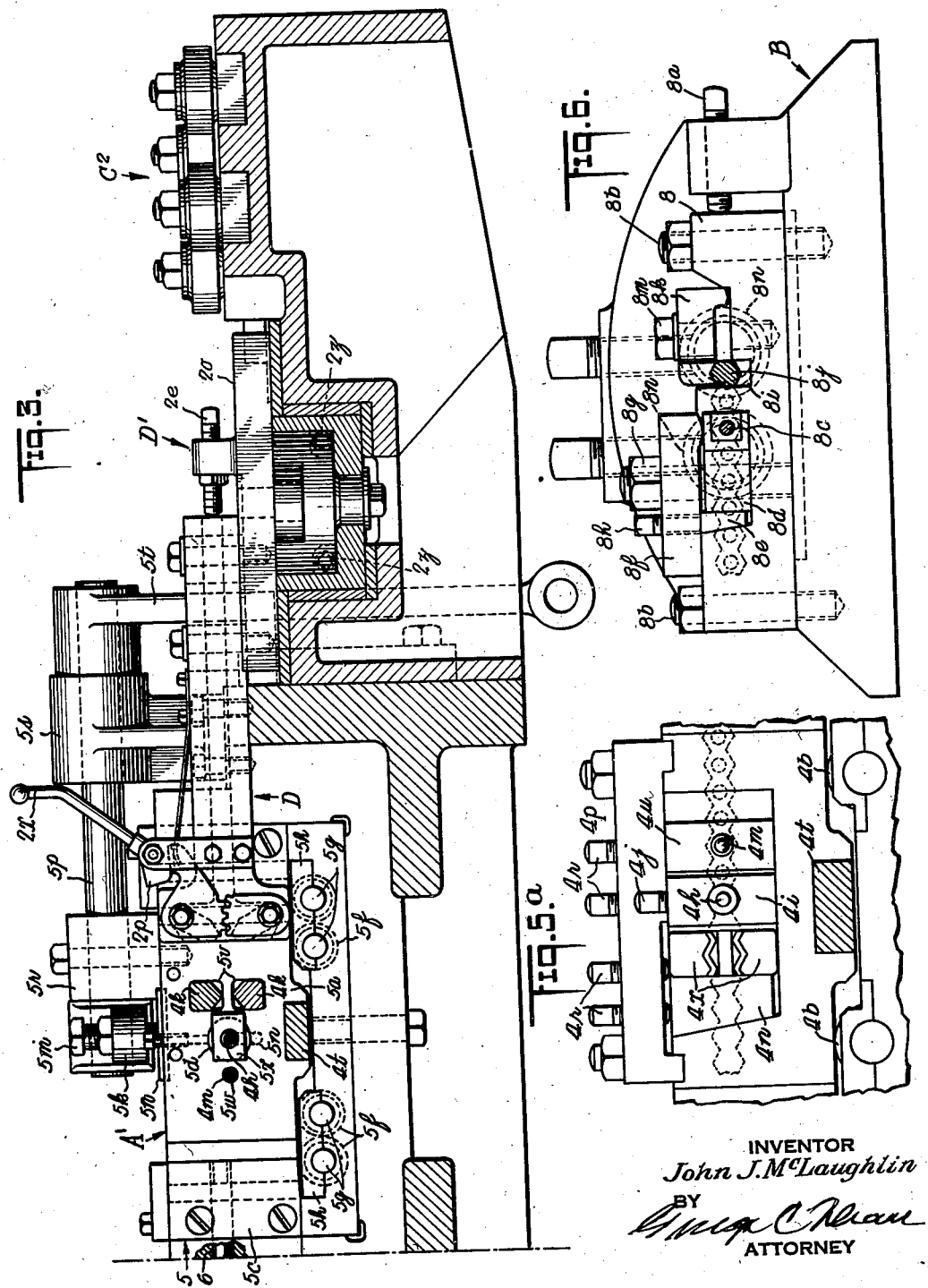

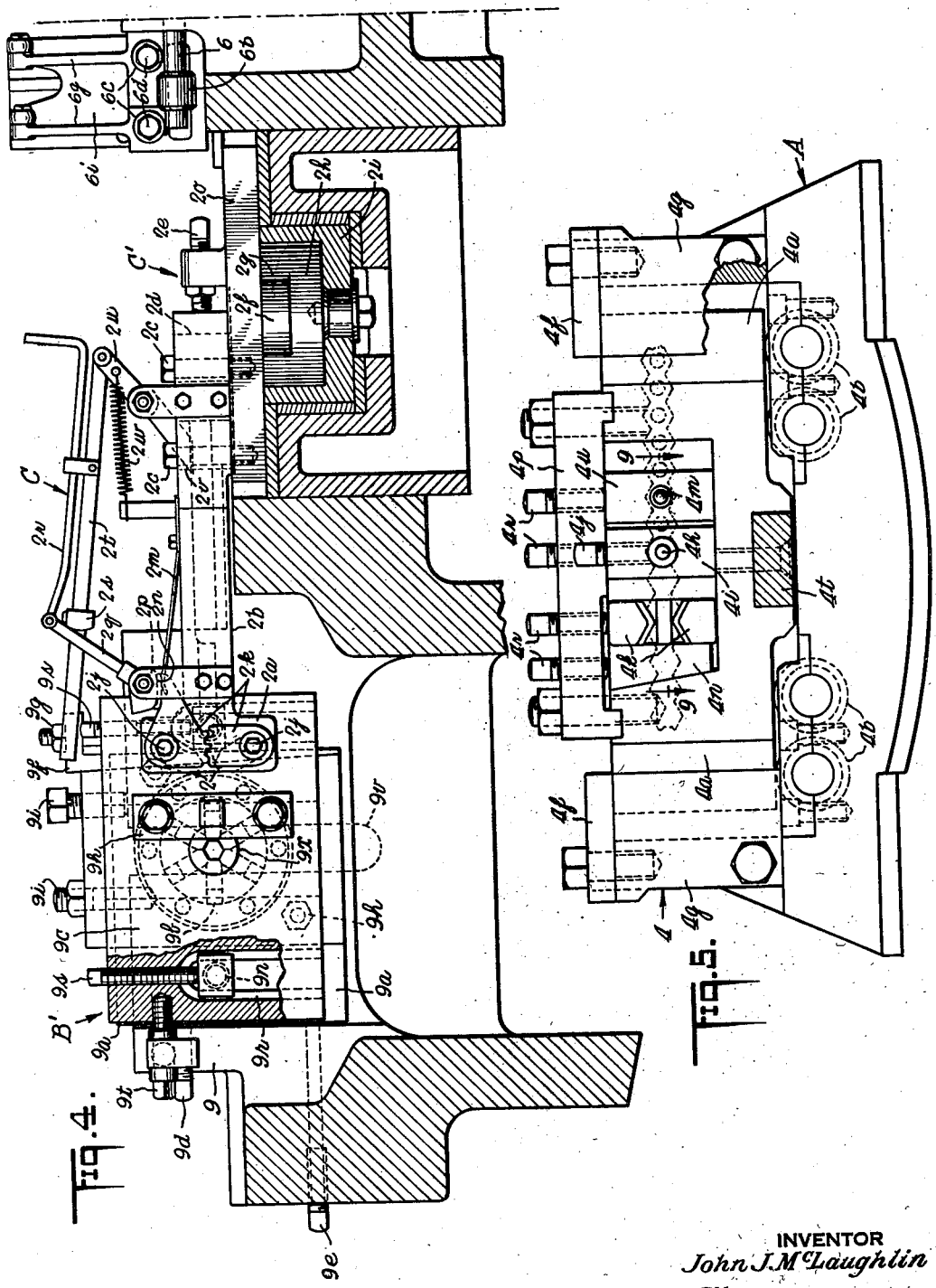

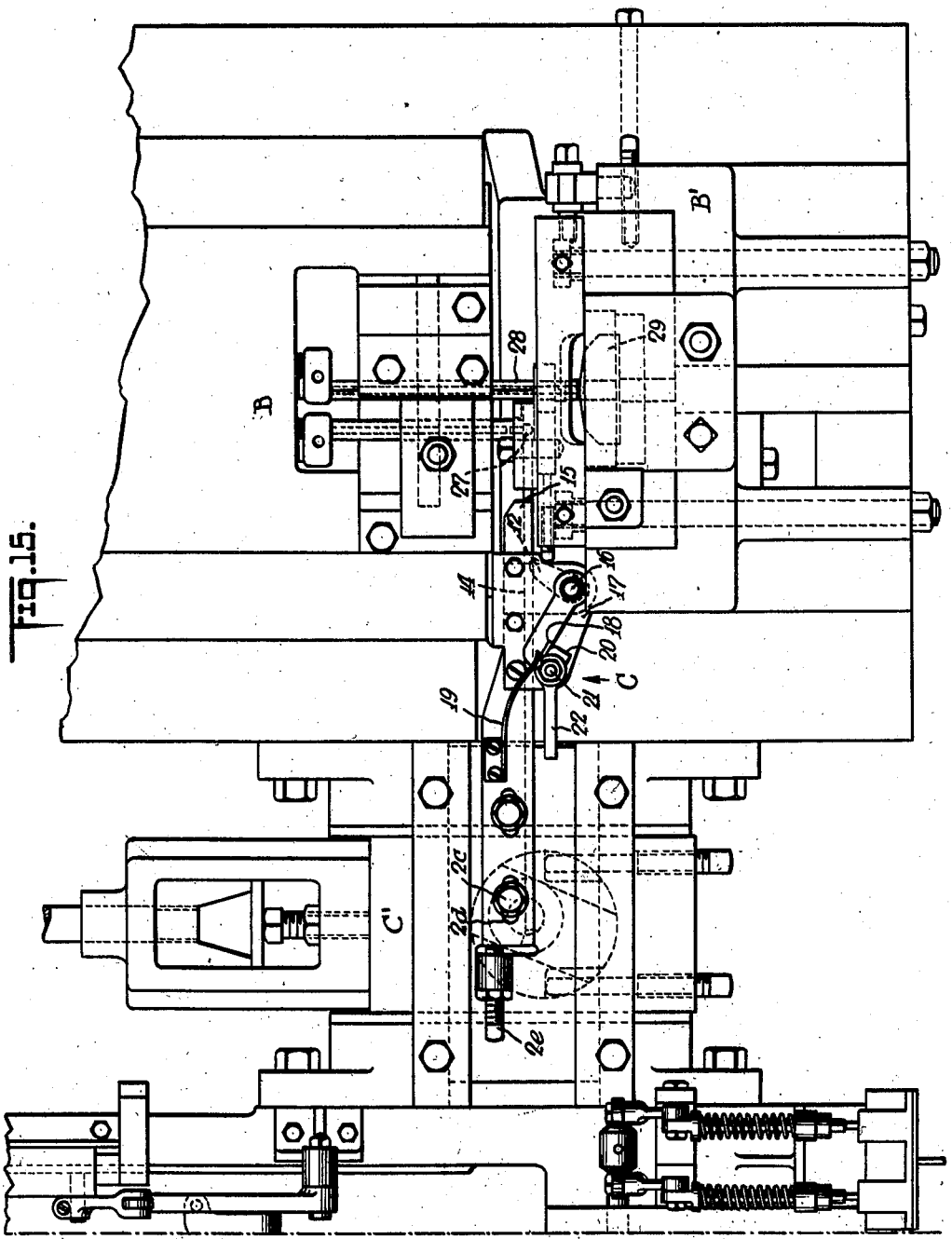

Patented Nov. 12, 1940

2,221,598

UNITED STATES PATENT OFFICE 2,221,598

MACHINE AND METHOD FOR MAKING NUT BLANKS

John J. McLaughlin, North Tonawanda, N. Y., assignor to Buffalo Bolt Company, North Tonawanda, N. Y., a corporation of New York Application December 21, 1938, Serial No. 246,930

27 Claims. (Cl. 10—76)

This invention relates to machines for continuous, large-quantity production of separate blanks from bar stock that has been shaped so as to form a series of connected, partially-shaped blanks. In this case, the invention is shown as embodied in a machine in which the blanks are nut blanks and in the preferred form the edges of the bars have been notched to form partially-shaped hex blanks, preferably with notches that approximate the 120° angle required for a serrated bar with hex peak edges; but most features of the invention are applicable to the manufacture of hex nut blanks from bars that have spaced-apart, 60° notches; or that are face-rolled to partially form connected blanks for square nuts; and some of the features are applicable for making other shaped articles from other forms of partially-shaped blank bars.

In such machines, the bars formed with the connected, partially-shaped blanks, are advanced step-by-step, and between steps are held stationary in exact registry with successive tools for performing successive operations on the blanks. For nut blanks, these operations commonly include punching a cylindrical hole through the center of each successive blank; then severing each blank from the end of the bar on lines equidistant from each cylindrical hole; then forcing the hexagonal blanks through a trimming die, so that all its trimmed faces will be equidistant from the axis of its cylindrical hole.

In most cases the severing, and the trimming of the severed blanks, are effected without an intermediate spacing step, the blank being cut off and forced through the trimming die by a single reciprocation of the press. While this is true in the present case, one novel feature of my invention is effecting a partial severing of the pierced blank a step or two in advance of the cut-off and trim, as will be explained.

There are various difficulties in performing even the two-step method of doing heavy preliminary work such as piercing the hole in one blank while also doing other heavy finishing work such as severing a previously-pierced blank at or near the end of the same bar. I have discovered that the piercing stretches the metal radially of the punch and this stretching causes changes in shape as well as dimensions of the blanks.

I have found by experience that these difficulties make it impractical to perform all these operations in a single press, and my present invention contemplates obviating them by providing two separate press blocks, one for the piercing operation and another for the severing and trimming. These separate presses are reciprocated in proper time relation to one another and to the intermittent feed mechanism, preferably from the same power shaft.

Another important feature is having the main step-by-step feed mechanism located between these two presses so that the stock is pulled through the piercing mechanism and pushed through the cut-off and trim mechanism. One object in locating this feeder in this position, is to have it as near as possible to the cut-off and trim mechanism. Preferably it is a type of feed mechanism that engages the notches in the bar by ratchet-like fingers that slip over the serration on the rearward movement and have an excess of rearward movement so that in operation they move forward a slight distance before engaging the forward faces of the notches. This forward lost motion is always greater than any possible stretching of the blanks so that the only accurate adjustment required is the one necessary for accurately gauging the location of the fingers at the end of their forward feed movement. Mechanism very suitable for this purpose is shown in the patent to Jones, 2,085,590, and as a matter of fact the mechanism shown in this patent was designed primarily for combination with this type of machine, as indicated page 1, line 7, and elsewhere in said patent.

In combination with this intermediate normally operating feed mechanism, I employ an auxiliary feeder whereby the bar is fed into the machine until it has passed the perforating punch and has reached the main feeder, whereupon the auxiliary feeder is thrown out of operation and reciprocates idly until it becomes necessary to feed in a new stock bar or strip.

While these two feeding mechanisms are identical, it will be noted that there is only one set of friction rolls to afford resistance to the pull of whichever feeder is working.

There are other novel features in the thus organized machine. One is providing the piercing block with reciprocating pilot member adapted to wedge edgewise between slanting surfaces of a notch or other depression in each partially formed blank. This pilot wedge is accurately located in the piercing block parallel with and properly spaced with respect to the piercing punch, and when wedged over the bar it operates to shift both its block and its die block parallel with the stock, so that the piercing tool and die are shifted into exact registry with the center of each successive blank. To permit this, the piercing blocks are mounted on rollers and are connected so that both blocks shift equally. If the longitudinal shifting of said blocks exceeds a predetermined limit, the shift operates to open the circuit of the main drive motor, thereby stopping the entire machine.

The shiftable piercing block also carries a detector finger which is located beyond the piercing tool in exactly the right position so that it normally reciprocates freely through each pierced hole, but it is slidable endwise and if the piercer has been broken off or the hole is otherwise obstructed, the obstruction causes the finger to slide reversely, whereupon other suitable mechanism opens the circuit of the main driving motor, thereby stopping the entire machine.

One object in locating the main feeder between the two press blocks, is to have said feeder only a blank or two away from the severing tools in the second press block, so that the pierced blanks are registered very accurately with said tools. These include an offsetting tool whereby successive blanks are displaced flatwise a distance which is relatively slight as compared with the thickness of the blank. The metal is thus partially sheared, and the distortion of the unsheared part of the metal is localized so nearly in an exact transverse plane, that final shearing is easily localized in said plane. Thereafter, continued step-by-step feed brings this transverse plane of the end blank into exact registry with the final shear punch. Here the pilot pin of the shear punch engages the central hole in the end blank; shears the blank in said transverse plane; and pushes it into the entrance end of the trimming die, where it remains until succeeding nuts push it through said die and out of the discharge end thereof.

This machine is readily adaptable for making square nuts. In such case, the stock is without edge notches, but the flat faces are rolled to form a succession of crowned blanks each having a partially formed central hole. To use this stock in the machine requires only changing the stock engaging member of the feed mechanisms and the tools. In such case, a single, laterally-swinging feed finger or pawl is used, and this has a projection which accurately fits the forward wall of the partially formed central holes in the blanks. A centering or locating punch is used in the first press which accurately fits into said partially formed hole, and serves the same purpose as the pair of edge-notch wedges used for hex blanks. The tools are of course changed from hexagon to square, but the functioning of the feeds, and of first and second presses, is otherwise substantially the same for hex nuts and square nuts.

The above and other features of my invention may be more fully understood from the following description in connection with the accompanying drawings, in which Figs. 1 and 2 taken together, constitute a plan view of the machine, Fig. 1, Sheet 1, being the entrance half of the machine, and Fig. 2, being the cutoff and trim half of the machine;

Figs. 3 and 4 similarly taken together, constitute a longitudinal section of the machine on the line 3—3, Fig. 1, and 4—4, Fig. 2;

Fig. 5 is a front end elevation of the reciprocating press block which carries the piercing punch;

Fig. 5a is a similar view of a modification;

Fig. 6 is a similar view of the reciprocating press block that carries the offsetting and cutoff tools;

Figure 11:
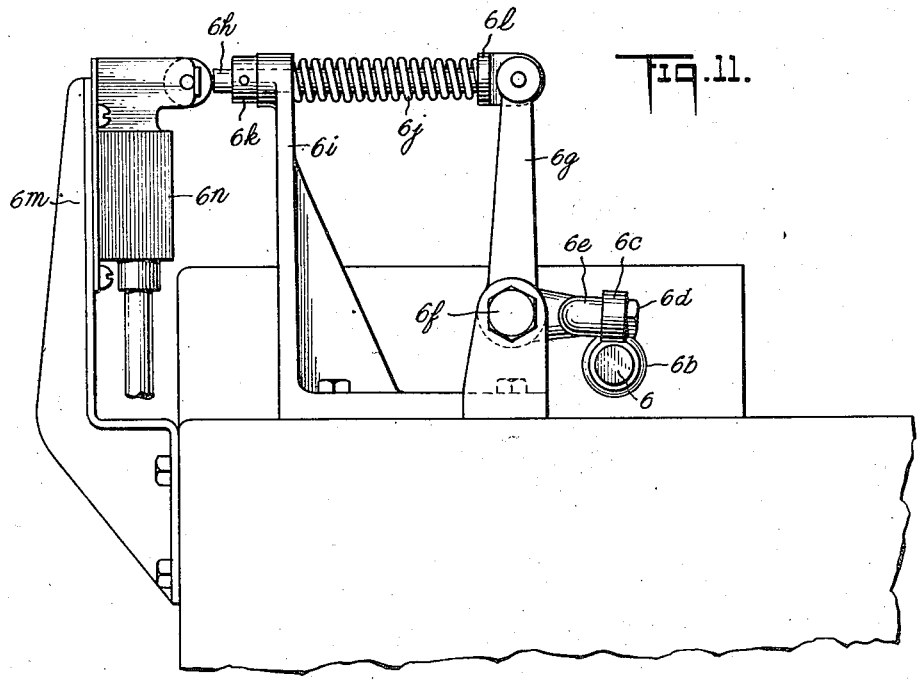
Figure 10:
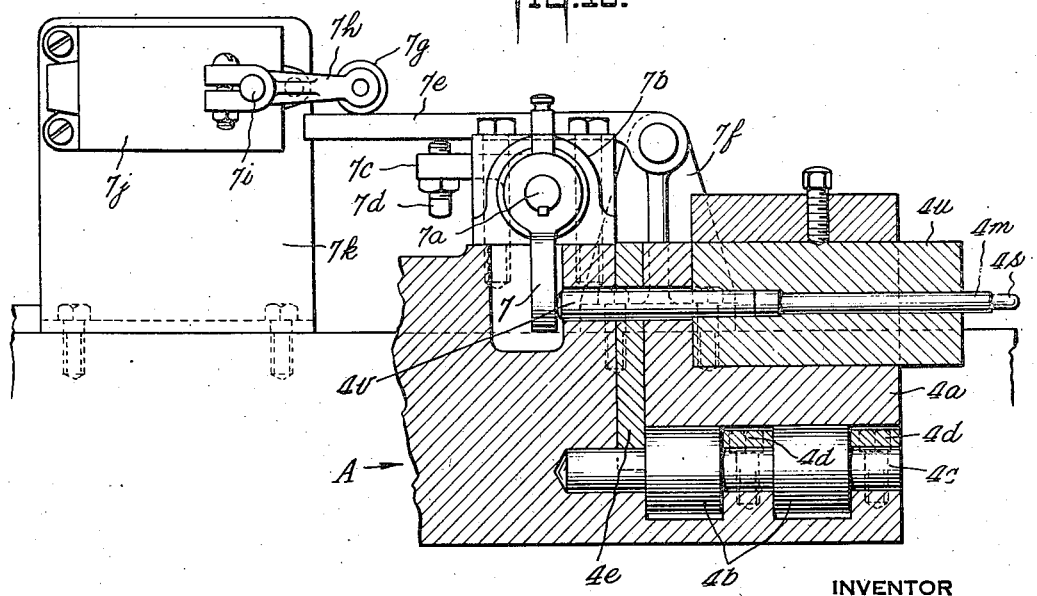

Figs. 7 and 8 taken together constitute a schematic view showing the successive operations on the stock bar;

Fig. 9 is detail horizontal section on the line 9—9, Fig. 5, showing the relations of the piercing punch and die, to the locating wedge fingers in advance of them, and to the detector finger beyond them;

Fig. 10 is a detail vertical section on line 10—10, Fig. 1, showing the mechanism whereby, when the central hole in the nut is not punched, or is obstructed, a switch is thrown to stop the entire machine;

Fig. 11 is a detail side elevation of another stop mechanism whereby the machine is stopped when shift of the piercing press blocks exceeds a predetermined limit;

Figs. 12 and 13 are horizontal sections like Fig. 9, but showing the offsetting and shear punches of press B; Fig. 12, showing the position of the parts just after the shear; and Fig. 13, at the end of the forward stroke when the offsetting punch has completed its work and the shear punch has deposited the blank in the trimming die;

Figs. 14 and 15, taken together, are a plan view like Figs. 1 and 2, but showing the simple changes necessary for making square nuts, instead of hex nuts; and Fig. 16 is a detail horizontal section showing the feeding pawl and stock bar for square nuts.

Referring to combined Figs. 1 and 2, constituting the plan view of the machine as equipped for making hex nuts:

The principal group mechanisms constituting the machine, comprise the piercing press of which A is the reciprocating member and A' the stationary member; the cutoff press of which B is the reciprocating member and B' the stationary member; the intermediate main feeder of which C is the reciprocating stock engaging member, C' the means for driving said member in proper timed relation to reciprocating press members A and B, $C^2$ the friction rolls at the entrance end to the machine, which afford the resistance against which this main feeder pulls the stock; and finally, the auxiliary feeder of which D is the reciprocating stock engaging member, D' the reciprocating mechanism for driving stock engaging member D in proper timed relation to the piercing press A, and $C^2$ which are the same friction rolls that normally serve the main feeder C.

As noted above, the main and auxiliary feeders are preferably alike and are driven from the same main shaft as the presses, by cams like those shown in Jones Patent No. 2,085,590. The stock engaging members for the edge notched bars used for hex nuts are like those in all the principal figures of said patent; and the stock engaging pawl for square nuts is preferably like the modification shown in Figs. 11 and 12 of said patent. For this reason, it is not necessary to more than briefly identify the main features of said feeders.

As shown in Fig. 4, the notch-engaging fingers 2, are pivoted to a head 2a, which is rigidly secured to an arm 2b by bolts 2c passing through slots 2d, whereby the arm is longitudinally adjustable on slide 2o by means of screw 2e. As shown in Figs. 2 and 4, this slide is reciprocated lengthwise of the machine through a depending anti-friction roller 2f fitting in a diagonal slot 2g in the face of a cylindrical member 2h, pivotally adjustable in a transversely reciprocating slide 2i, by screws 2z. The fingers 2 are mounted on pivots 2j which are keyed to gear segments 2k whereby the fingers swing equally and oppositely in toggle relation to opposite notches in the blank bar, and are normally spring pressed into such engagement by spring 2m. Inward swing is limited by tail piece 2n engaging one face of a cam 2p controlled by lever 2q which can be rotated by pushing rod 2r to the left, thereby rotating the cam to depress the tail piece and swing the free ends of the fingers 2 out of the bar notches. In the present case, they can be automatically thrown out by an adjustable stop member 2s on bar 2t, pivoted to lever 2u, having an end 2v which is adapted to bear upon the edge of the blank bar in the stock guideway, and is normally spring pressed into engagement therewith by spring 2w. This automatic finger shift mechanism will remain in the position shown in Fig. 4 until the stock is no longer supplied to the machine. Thereafter, the spring 2w automatically swings lever 2u, thereby rotating cam 2p and throwing fingers 2 out of engagement with the stock. The transverse slide 2i is reciprocated in parallelism with presses A and B, and preferably by cams on the same shaft, as described in said Jones patent.

The auxiliary feeder D is preferably the same as main feeder C, except that the throw-out 2p is rotated by hand-lever 2x, to throw out fingers 2z and the automatic throw-out being omitted.

These feed mechanisms are specially adapted to cooperate in combination, so that the main feeder can non-interferingly pick up feed of the pierced part of the serrated bar as soon as the auxiliary feeder has advanced said bar to said main feeder. The fingers are non-positively spring-pressed into the notches of the blank bar. Consequently, the diagonal slots 2g can be and preferably are adjusted so as to make the reciprocations longer than the distance between the rear feed faces of successive bar notches. So the exact location of the end of the forward feed movement is all that is important; and this may be exactly predetermined for each feeder independently of the other, by adjusting their respective screws 2e.

As described in the Jones patent, the idle roll assembly C² at the entrance end of the machine, has its frame bolted to the frame of the auxiliary feeder D, and the latter is bolted to the frame of piercing press A. The piercing press frame is bolted to the frame of the intermediate main feeder C, and the latter is bolted to the frame of the offset, cutoff and trim press B.

As shown in Fig. 1, the rolls 3 are carried on slides 3a by pins 3b and are adjustable to or from the stock by screws 3c and are there held by clamping bolts 3d. Rolls 3e are carried by gate 3f which swings on pin 3g in the main housing. The gate is held in position by an eccentric 3h rotatable on pivot studs 3i. These rolls may serve the double purpose of straightening the stock and holding the stock from backing up on the rearward strokes of the arm and fingers.

The auxiliary feeder D feeds the stock step by step through press B where the nut blanks are centrally pierced, and then onward until the fingers of the main feeder C can fall into the edge notches of the stock, whereupon the auxiliary feeder D is thrown out as described above, and main feeder C is thrown in. Thereafter, the main feeder pulls the stock through the piercing press A and pushes it into offset, cutoff and trim press B.

As best shown in detail views Figs. 5 and 10, the piercing slide A is formed or provided with a rectangular housing 4, which carries the punch block 4a; and this punch block is mounted in the housing so that it can slide a limited distance parallel with the direction of feed of the stock. To permit this it is mounted on roller bearings 4b, which turn on pins 4c held in place by caps 4d. To prevent rearward movement, the punch block slides on a hardened steel wear piece 4e, which is bolted to said housing. The housing is held down on the roller bearings by gibs 4f, 4f; and, as shown in Fig. 1, the housing is prevented from moving away from the steel wear piece by gibs 4g, 4g. The piercing punch 4h is held in its holder 4i by set screw 4j. This holder in turn is carried by the punch block 4a. The punch block also carries the centering or locating fingers 4k in advance of the punch, and also an automatic stop pin 4m, beyond said piercing punch. Spacing blocks are placed between these several parts and are held together by wedge 4n. Clamp 4p is bolted down on the punch block and carries set screws 4r which hold down the several parts.

The locating fingers 4k are designed to slide endwise into wedging fit with adjacent hex edges of the bar, and the bar being held stationary by the roll assembly C², any irregularity in lengths of blanks will have the effect of camming the entire punch block parallel with the direction of feed, thereby bringing the punch in exact registry with the center of a blank to be punched. In Fig. 5, the wedging surfaces of 4k are designed to wedge outward against adjacent surfaces of a notch; but in Fig. 5a, the surfaces 4x are designed to wedge inward against adjacent surfaces of a peak. The latter form is preferable because bar peaks are rolled by roll valley surfaces, which wear and change contour less than roll peak surfaces.

As shown in Figs. 1 and 3, the stationary frame A' of the piercing press has rigidly secured thereto a stationary rectangular housing 5, in which a rectangular die block 5a is rigidly held against rearward movement by hardened steel wear piece 5b and against forward movement by gibs 5c. This die block carries the piercing die 5d. As shown in Figs. 3 and 9, the punched-out slugs are forced out through passage 5y; and the face of the die block 5a has clearance holes, 5v, for the locating fingers 4k, and 5w for the detector finger 4m; and has secured to it a stripper 5x for piercing punch 4h.

The die block 5a is mounted in housing 5, on roller bearings 5f which turn on pins 5g, held in place by caps 5h; so that it can slide parallel with the direction of feed of the stock, the same distance as piercing block 4a.

To keep the non-reciprocating piercing die in exact alignment with the reciprocating punch, the bottom of the punch block 4a is provided with a rigidly secured bar 4t, which extends transversely below the path of movement of the stock bar, and which endwise slidably fits the die block 5a; so that when the locating fingers 4k cam the punch block parallel with the direction of feed of the stock, said bar 4t will shift said die block exactly the same distance.

To prevent such shifting movement of the punch and die blocks during times when the stock is being fed through the machine, intermittently operating clamping mechanism is provided, comprising the clamping lever 5k having an adjustable set screw 5m, which contacts with a knurled plate 5n on die block 5a. This lever is keyed and clamped to shaft 5p, which turns in bearings 5r and 5s. This shaft has keyed to one end, a long depending lever 5t which is actuated in proper timed relation by a cam (not shown) on the main shaft of the machine. The movement of this mechanism is so timed that the set screw 5m clamps the die block, and prevents lengthwise shift thereof, during times when the stock is being fed through the machine.

When the above described shift of the piercing and die blocks exceeds a certain predetermined maximum, in either direction, it automatically operates a switch, which stops the main drive shaft. By reference to Figs. 1 and 2 in the region of the broken line where they join one another, in connection with the detail view Fig. 11, it will be seen that the shiftable die block has a stem 6 tapped into it, which passes through the housing 5; and, on the projecting end of said stem, is fastened a collar 6b. In the path of endwise shift of this collar are spaced apart anti-friction rollers 6c on pins 6d, carried by horizontal arms 6e of spaced-apart bell crank levers pivoted at 6f and each having an upwardly extending arm 6g. To the upper ends of said bell crank arms 6g are pivoted thrust rods 6h which are endwise slidable in bracket 6i, and said rods are spring pressed rearwardly by springs 6j pushing against said bracket 6i at one end and against rod collars 6l at the other end. On the end of each rod 6h, where it projects beyond bracket 6i, is an adjustable stop collar 6k. These stop collars 6k are each tensioned against the bracket 6i by its spring 6j, and said stop collars are adjusted so as to bring the rolls 6c on the lower ends of the horizontal arms 6e, just clear of the stem 6 which is carried by the die block; but if and when said stem shifts endwise beyond a predetermined limit in either direction, its collar 6b will contact with one or the other of said rolls and will push the horizontal arm thereof upward. On the upper end of a fixed bracket 6m, are two electric switches 6n, 6n, each controlling the driving motor circuit and when either rod 6h is thus thrust forward, it pushes against its switch 6n, thereby opening said switch and stopping the driving motor and the machine.

The detector finger 4m is located exactly where a pierced hole should be when the punch 4h is piercing a hole in a following blank; and in Fig. 5, the finger is exactly two blank lengths beyond said punch. The mechanism whereby the finger can operate a switch to stop the machine, is shown in the plan view at the right hand end of Fig. 1, taken with the left hand end of Fig. 2; and it is shown in the sectional side elevation in Fig. 10. The tip 4s of 4m is exactly the right size to slide endwise in the pierced hole at the end of every forward reciprocation of the punch slide, but, as shown in Fig. 10, finger 4m is slidable endwise in block 4u; and its rear end 4v is in position to contact with depending lever arm 7 of the switch operating mechanism.

The arm 7 is keyed on shaft 7a which is rotatable in bracket 7b carried by the slide A. Shaft 7a extends endwise over the frame and has keyed to it the horizontal lever arm 7c, which is provided with an adjustable set screw 7d engaging the lower face of another horizontal lever 7e, which is rotatably mounted in a bracket 7f, on the stationary frame of the press. The free end of this lever 7e extends under an anti-friction roller 7g on the end of a third lever, 7h, which is adjustably clamped on a rotary shaft 7i, which operates switch mechanism in a casing 7j, which is bolted to bracket 7k on the frame of the press.

With the parts adjusted to the position shown, reciprocation of the punch block carries the detector finger into and out of the successive pierced holes presented to it, but if the hole is not presented, or if it is blocked in any way, the detector 4m is pushed backward and through the mechanism shown, lifts the lever 7e, and throws the switch, thereby stopping the machine.

After being gauged by locating fingers, pierced by the piercing punch, and holes tested by the detector finger, the pierced stock strip ultimately reaches the feed fingers of the main feeder C; whereupon the auxiliary starting feeder D is thrown out and the main feeder thrown in. Thereafter the feed and location of the blanks in the piercing press is controlled solely by the location of the main feeder fingers 2, when at the end of their forward strokes. That is why the piercing blocks are slidable and have their positions shiftably fixed by the locating fingers 4k, by and in accordance with any variations of total length of intervening pierced stock. At this time, changes in shape or length of the intervening blanks, or their notches, which may have been caused by piercing, can be relied upon as very nearly uniform; and such minute non-uniformities as can occur, normally average out enough to be taken care of within the limits of shifts that will not operate the stop switch 6n. So the location of the main feed fingers 2 at their forward stroke, bears the same relation to the tools of the offset and cutoff press that the locating fingers 4k have to the piercing punch; and such location of the feed fingers is secured by careful adjustment of the main feeder arm 2b on its reciprocating carriage by means of the rear thrust screw 2e. Preferably this location is exactly in the second bar notch rearward from the shearing edge of the offsetting tool.

As shown in Figs. 2 and 6, the slide B of the offset, sever, and trim press, carries a punch block 8 laterally engaged by thrust screw 8a and held down by bolts 8b. The offsetting punch 8c is held sidewise by filler 8d and wedge 8e and is held down by clamp 8f secured by bolt 8g, pressure being maintained on said wedge by screws 8h. The cutoff punch 8j rests in shoe 8i and is held down by clamp 8k and clamp screws 8m.

The offsetting punch 8c and the cutoff punch 8j are independently adjustable endwise, by backing screws 8n to regulate precisely the depth of their movement toward the respective offset and trimming dies. These screws have heads of substantial diameter, so as to serve as adjusting means for the respective punches, when the latter are spaced further apart, for larger nuts.

The stationary die member B' is shown in Figs. 2, 4 and 12. It comprises the fixed housing 9 in which is mounted the adjustable housing 9a, containing the trimming die assembly 9b, and which is closed in at the front by die block 9c, which carries the offset and severing dies.

The adjustable housing 9a is adjustable laterally by thrust screws 9d, 9e, and is thrust against said screws by the wedge 9f, which latter is held down by nut and stud screw, 9g. The adjustable housing 9a is clamped against housing 9 by bolts 9h; and is raised or lowered by screws 9i. The trimming die assembly 9b is rigidly screwed to the front face of the rear wall of the adjustable housing 9a; and is adjusted by adjusting said housing.

As shown in Fig. 2, the front die block 9c is tensioned rearwardly by T-headed bolts 9n and, as shown in Fig. 4, the T-heads of these bolts fit loosely in slideways 9r, so as to permit vertical and longitudinal adjustment of said die block. The vertical adjustment is by means of screws 9s, which apply thrust against the heads of bolts 9n; and the horizontal adjustment is by screw 9t. When bolts 9n are tightened, they force the front die block 9c rearwardly against trimming die assembly 9b, and adjustable housing 9a.

The cutoff die 9x is circular and is pressed into the die block 9c. The offsetting die 9j (see Fig. 12) is held in place by set screw 9k. A stripper 9m for stripping the stock from the punches, is bolted to the face of the die block.

Nuts, chips, and oil are discharged through an open, down-sloping channel 9v.

The operative relations of the cutoff and severing punches and dies, to each other, and to the stock, are shown in Figs. 12 and 13. In Fig. 12, the cutoff punch 8j has severed the end nut and pushed it part way through the shearing die 9x. As shown in Fig. 13, completion of the forward stroke of the cutoff punch pushes the severed nut blank into the top of the trimming die 9b; and, at this point, the offsetting shear punch has offset a blank, a distance which is very small as compared with its thickness, but is sufficient to weaken the metal in the transverse plane of the offset, as above described, thereby making it easier for the cutoff punch to sever it.

It will be obvious that the above described machine may be used for making nut blanks of any desired size, provided the length of the bar stock be at least equal to the distance between the auxiliary starting feeder D, and the offsetting punch 8c. In such case the piercing press, and the cutoff and shear press will operate successively on bars of said lengths, and these bars may be fed to the machine one after another, but any such discontinuity in the length of stock tends to introduce irregularities in the distance between the pierced holes of adjacent ends of the successive stock bars. For this reason, the machine is peculiarly adapted for making nuts which are small enough to permit the use of blanks thin enough to be sprung flatwise, sufficiently to make a coil. In a special case, strips for ⅜″ S. A. E. nuts have been edge-rolled and then curved flatwise to form coils of large diameter, say, four feet. With large enough diameter, the individual blanks have very little curvature, and what little curvature there is, can be taken out in the friction rolls $C^2$, without causing any measurable distortion of the individual blanks.

As shown in Figs. 14, 15 and 16, the above machine can be used for making square nuts, by substituting blank bars having plane parallel edges and face rolled depressions, instead of hex edge notches; substituting feeder arms each having a clamping finger adapted to engage the face rolled depressions; substituting a locator adapted to fit said depressions; and substituting a square cutoff and trim punch and die.

As shown in Fig. 16, the bar blank $x$, has depressions $x'$ rolled in one or both faces; also one face is rolled with crowns $x^2$; also the other face is flat. The laterally swinging finger 12 has a projection 13 fitting into the depression $x'$ and it wedges the blank bar against the vertical surface 14 of a channel arm 15. The construction and operation of this feeder is the same as that shown in Figs. 11 and 12 of the Jones patent above referred to. The channel arm 15 has slots 2d to be held by bolts 2c, the same as for the hex bar feeder. The finger is mounted on a pivot 16 rotatable in a bracket 17 on said arm. The pivot has non-rotatably secured to it a tail piece 18 urged by spring 19 against a stop surface on the periphery of a throw-out cam 20 pivoted at 21 and which has a second cam face more remote from the pivot 21. This cam can be rotated by handle 22 to hold the finger 12 away from the blank bar, and lock it in the inoperative position.

The only other change required for the piercing press is the locating finger 23 adapted for wedging engagement with the partially pierced depression $x'$, in the face of the blank. It is endwise slidable in the holder 24, as shown in Fig. 14; and is normally spring-pressed forward by plunger 25 which is actuated by spring 26.

As shown in Fig. 15, the main feeder is the same as the auxiliary feeder described above and the offsetting tool, cutoff and trim plunger 28 and the trimming die 29, are the same as those shown for the hex blanks, except that they are square instead of hexagonal.

I claim:

1. A method of making nut blanks from stock bars or strips having depressions outlining a series of substantially uniform blanks, by step-by-step feeding, piercing, and severing, successive blanks, which method includes applying predetermined non-positive resistance to feed on the incoming stock at a point in advance of the piercing point; piercing successive blanks, thereby expanding each blank and lengthening the strip to the full extent required for completed blanks which are to be severed from the end of the strip; engaging successive blanks of the thus-lengthened strip and pushing them into registry with the severing punch by successive steps, each equal to the length of one blank, while also pulling the strip to overcome said non-positive resistance.

2. A method of making nut blanks from stock bars or strips having depressions outlining a series of substantially uniform blanks, by step-by-step feeding, piercing, and severing, successive blanks, which method includes applying predetermined non-positive resistance to feed on the incoming stock, and pulling it positively step by step through the piercing mechanism while pushing it through the severing mechanism; utilizing the depressions in the stock to shift the position of the piercing mechanism by and in accordance with depressions in blanks approaching said piercing mechanism; and piercing one of the blanks while testing the accuracy of the piercing of a blank previously pierced, and utilizing inaccuracies to stop the machine.

3. A method of making nut blanks from stock bars or strips having depressions outlining a series of substantially uniform blanks, by step-by-step feeding, piercing, and severing, successive blanks, which method includes applying resistance to feed on the incoming stock, and pulling it step by step through the piercing mechanism while pushing it through the severing mechanism; utilizing the depressions in the stock to gauge the position of the piercing mechanism by and in accordance with depressions in blanks approaching said piercing mechanism; piercing one of the blanks while testing the accuracy of the piercing of a blank previously pierced, and utilizing inaccuracies to stop the machine; and the severing including slightly offsetting the blank to weaken the metal in the transverse plane of the offset and thereafter severing successive blanks from the end of the stock, in the plane of said offset.

4. A method of making nut blanks from stock bars or strips having depressions outlining a series of substantially uniform blanks, by step-by-step feeding, piercing, and severing, successive blanks, which method includes applying resistance to feed on the incoming stock, and pulling it step by step through the piercing mechanism while pushing it through the severing mechanism; the severing including slightly offsetting the blank to weaken the metal in the transverse plane of the offset and thereafter severing successive blanks from the end of the stock, in the plane of said offset.

5. A method of making nut blanks from stock bars or strips having depressions outlining a series of substantially uniform blanks, by step-by-step feeding, piercing, and severing, successive blanks, which method includes applying resistance to feed on the incoming stock, and pulling it step by step through the piercing mechanism while pushing it through the severing mechanism; and piercing one of the blanks while testing the accuracy of the hole in a blank previously pierced, and utilizing inaccuracies of the spacings of said depressions to stop the machine as a whole.

6. A method of making nut blanks from stock bars or strips having depressions outlining a series of substantially uniform blanks, by step-by-step feeding, piercing, and severing, successive blanks, which method includes severing the stock by first slightly offsetting each blank to weaken the metal in the transverse plane of the offset, and thereafter severing successive blanks from the end of the stock, in the plane of said offset.

7. A method of making nut blanks from stock bars or strips having depressions outlining a series of substantially uniform blanks, by step-by-step feeding, piercing, and severing, successive blanks, which method includes severing the stock by first slightly offsetting each blank to weaken the metal in the transverse plane of the offset, and thereafter severing successive blanks from the end of the stock, in the plane of said offset; and utilizing the depressions in the strip to gauge the position of the piercing mechanism by and in accordance with depressions in blanks approaching said piercing mechanism.

8. A method of making nut blanks from stock bars or strips having depressions outlining a series of substantially uniform blanks, by step-by-step feeding, piercing, and severing, successive blanks, which method includes severing the stock by first slightly offsetting each blank to weaken the metal in the transverse plane of the offset, and thereafter severing successive blanks from the end of the stock, in the plane of said offset; utilizing the depressions in the strip to gauge the position of the piercing mechanism by and in accordance with depressions in blanks approaching said piercing mechanism; and piercing one of the blanks while testing the accuracy of piercing of a blank previously pierced and utilizing inaccuracies to stop the machine.

9. A method of making nut blanks from stock bars or strips having depressions outlining a series of substantially uniform blanks, by step-by-step feeding, piercing, and severing, successive blanks, which method includes piercing one of the blanks while testing the accuracy of the hole of a blank previously pierced and utilizing failure to form a complete open hole by said piercing, to stop the machine as a whole.

10. A method of making nut blanks from stock bars or strips having depressions outlining a series of substantially uniform blanks, by step-by-step feeding, piercing, and severing, successive blanks, which method includes utilizing the depressions in the strip to shift the position of the piercing mechanism by and in accordance with depressions in blanks approaching said piercing mechanism.

11. A method of making nut blanks from stock bars or strips having depressions outlining a series of substantially uniform blanks, by step-by-step feeding, piercing and severing successive blanks, which method includes pulling the strip through the piercing mechanism and pushing it through the severing mechanism; and utilizing the depressions in the strip to longitudinally shift the position of the piercing mechanism by and in accordance with depressions in blanks approaching said piercing mechanism.

12. A method of making nut blanks from stock bars or strips having depressions outlining a series of substantially uniform blanks, by step-by-step feeding, piercing and severing successive blanks, which method includes pulling the strip through the piercing mechanism and pushing it through the severing mechanism; utilizing the depressions in the strip to longitudinally shift the position of the piercing mechanism by and in accordance with depressions in blanks approaching said piercing mechanism; and utilizing excessive shift to stop the machine.

13. A method of making nut blanks from stock bars or strips having depressions outlining a series of substantially uniform blanks, by step-by-step feeding, piercing and severing successive blanks, which method includes pulling the strip through the piercing mechanism and pushing it through the severing mechanism; utilizing the depressions in the strip to longitudinally shift the position of the piercing mechanism by and in accordance with depressions in blanks approaching said piercing mechanism; piercing one of the blanks while testing the accuracy of piercing of a blank previously pierced and utilizing inaccuracies to stop the machine; and utilizing excessive shift to stop the machine.

14. A machine for making nut blanks from stock bars and strips having depressions outlining a series of substantially uniform blanks, which includes frictional rolls for applying predetermined, non-positive resistance to feed on the incoming stock, reciprocatory piercing mechanism, reciprocatory severing mechanism, and intermediate said piercing and severing mechanism, positive step-by-step feeding means adapted to engage successive pierced blanks to pull the stock through the piercing mechanism and push it through the severing mechanism, the length of each feeding step being equal to the length of the blank engaged by said feeding means.

15. A machine for making nut blanks from stock bars and strips having depressions outlining a series of substantially uniform blanks, which includes frictional rolls for applying predetermined, non-positive resistance to feed on the incoming stock, reciprocatory piercing mechanism, reciprocatory severing mechanism, intermediate said piercing and severing mechanism, positive step-by-step feeding means adapted to engage successive pierced blanks to pull the stock through the piercing mechanism and push it through the severing mechanism; and auxiliary step-by-step feeding mechanism for feeding the stock through the piercing mechanism until pierced blanks reach said intermediate feed mechanism, the length of each feeding step being equal to the length of the blank engaged by said feeding means.

16. A machine for making nut blanks from stock bars and strips having depressions outlining a series of substantially uniform blanks, which includes reciprocatory piercing mechanism, reciprocatory severing mechanism, intermediate step-by-step feeding means adapted to pull the stock through the piercing mechanism and push it through the severing mechanism; said piercing mechanism including a reciprocating piercing punch block and a stationary piercing die block, both shiftable longitudinally of the direction of feed, and means for shifting them including a blank locating device carried by the reciprocating block, adapted for wedging engagement with a depression a predetermined number of blanks in advance of the piercing punch.

17. A machine for making nut blanks from stock bars and strips having depressions outlining a series of substantially uniform blanks, which includes reciprocatory piercing mechanism, reciprocatory severing mechanism, intermediate step-by-step feeding means adapted to pull the stock through the piercing mechanism and push it through the severing mechanism; said piercing mechanism including a reciprocating piercing punch block and a stationary piercing die block, both shiftable longitudinally of the direction of feed, and means for shifting them including a blank locating device carried by the reciprocating block, adapted for wedging engagement with a depression a predetermined number of blanks in advance of the piercing punch; and means for stopping the machine when said shift of said piercing mechanism exceeds a predetermined limit in either direction.

18. A machine for making nut blanks from stock bars and strips having depressions outlining a series of substantially uniform blanks, which includes reciprocatory piercing mechanism, reciprocatory severing mechanism, intermediate step-by-step feeding means adapted to pull the stock through the piercing mechanism and push it through the severing mechanism; and a detector finger and a movable member by which it is carried into engagement with the stock, a predetermined number of blanks beyond the piercing mechanism adapted to stop the machine when the piercing is defective.

19. A machine for making nut blanks from stock bars and strips having depressions outlining a series of substantially uniform blanks, which includes a reciprocatory piercing mechanism, reciprocatory severing mechanism; and a detector finger and a movable member by which it is carried into engagement with the stock, a predetermined number of blanks beyond the piercing mechanism adapted to stop the machine when the piercing is defective; said piercing mechanism including a reciprocating piercing punch block and a stationary piercing die block, both shiftable longitudinally of the direction of feed, and means for shifting them including a blank locating device carried by the reciprocating block, adapted for wedging engagement with a depression a predetermined number of blanks in advance of the piercing punch; and means for stopping the machine when said shift of said piercing mechanism exceeds a predetermined limit in either direction.

20. A method of making nuts from stock bars or strips having depressions outlining a series of substantially uniform blanks, by step-by-step feeding of the bar to pierce successive blanks, which method includes applying non-positive approximately constant resistance to endwise movement of the stock and positively pushing the stock step-by-step against said resistance into approximate registry with the piercing punch and die; and utilizing the depressions in the stock to shift the position of the piercing punch and die in accordance with the depressions in blanks approaching them.

21. A method as specified in claim 20 and wherein the depressions are hex valleys and peaks in the edges of the stock bar and adjacent sides of the same hex valley are utilized to shift the position of the piercing punch and die.

22. A method as specified in claim 20 and wherein the depressions are hex valleys and peaks in the edges of the stock bar and adjacent sides of the same hex peak are utilized to shift the position of the piercing punch and die.

23. A method as specified in claim 20, and wherein the depressions include centered, partly formed punch holes in the sides of the blanks and the sides of said holes are utilized to shift the position of the piercing punch and die.

24. In a machine for making pierced blanks from stock bars or strips having depressions outlining a series of substantially uniform blanks, by step-by-step feeding of the bar to pierce successive blanks, means for applying approximately constant resistance to endwise feed movement of the stock, pawl and ratchet mechanism for feeding the bar step-by-step against said resistance into approximate registry with a punch and die of a reciprocating piercing press, means permitting shift of the press lengthwise of the stock, and locating fingers carried by the press, adapted for endwise wedging engagement with successive depressions in blanks approaching the punch, thereby to hold or shift the position of the piercing punch and die to center them on a blank that has been stepped into approximate registry therewith.

25. A machine as specified in claim 24, and wherein the depressions are hex valleys and peaks in the edges of the stock bar and adjacent sides of the same peak are engaged by the locating fingers.

26. A machine as specified in claim 24, and wherein the depressions are hex valleys and peaks in the edges of the stock bar and adjacent sides of the same hex peak are engaged by the locating fingers.

27. A machine as specified in claim 24, and wherein the depressions include centered, partly formed holes in the sides of the blanks and the sides of said holes are engaged by the locating finger.

JOHN J. McLAUGHLIN.